United States Patent [19]

Mallett et al.

[11] Patent Number: 4,700,803
[45] Date of Patent: Oct. 20, 1987

[54] TRANSDUCER FORMING COMPRESSION AND SHEAR WAVES FOR USE IN ACOUSTIC WELL LOGGING

[75] Inventors: A. J. Mallett; John W. Minear, both of Houston, Tex.

[73] Assignee: Halliburton Company, Duncan, Okla.

[21] Appl. No.: 912,283

[22] Filed: Sep. 29, 1986

[51] Int. Cl.[4] .................... G01V 1/40; G01V 1/143
[52] U.S. Cl. ................................. 181/106; 181/402; 367/25; 367/31; 367/75; 367/156; 367/168; 367/912
[58] Field of Search ............... 367/31, 75, 156, 168, 367/912, 137, 138, 25; 181/106, 110–113, 121, 402; 310/26; 179/110 C; 29/602 A

[56] References Cited

U.S. PATENT DOCUMENTS

| | | | |
|---|---|---|---|
| 2,190,666 | 2/1940 | Kallmeyer | 367/156 |
| 3,475,722 | 10/1969 | White | 367/31 |
| 3,593,255 | 7/1971 | White | 367/912 X |
| 3,931,533 | 1/1976 | Raso et al. | 310/26 X |
| 4,139,806 | 2/1979 | Kanber et al. | 310/26 X |
| 4,383,591 | 5/1983 | Ogura | 181/106 |

FOREIGN PATENT DOCUMENTS 2158580 11/1985 United Kingdom ............... 181/121

Primary Examiner—Deborah L. Kyle
Assistant Examiner—John E. Griffiths
Attorney, Agent, or Firm—William J. Beard

[57] ABSTRACT

For use in acoustic logging, an acoustic wave transducer system forming both compression and shear waves is disclosed, the system having the preferred form of a plurality of radially directed magnetostrictive expansion means, being N in number, each having a transducer plate affixed to the outer end thereof and further including means for providing a current to a coil wound thereabout forming flux initiating magnetostrictive expansion and contraction to form compression or shear waves.

4 Claims, 5 Drawing Figures

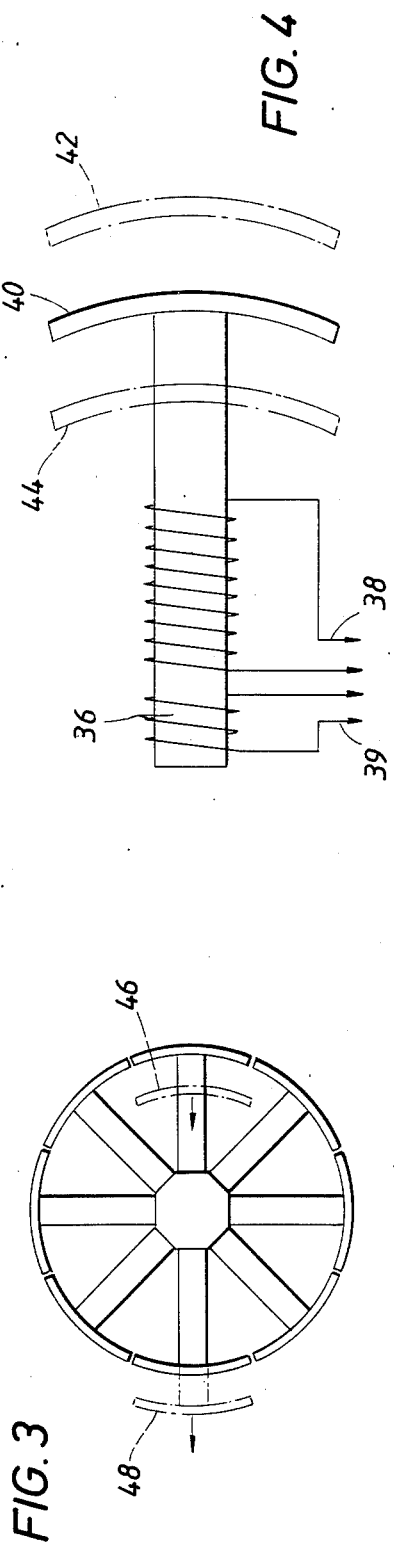
FIG. 3
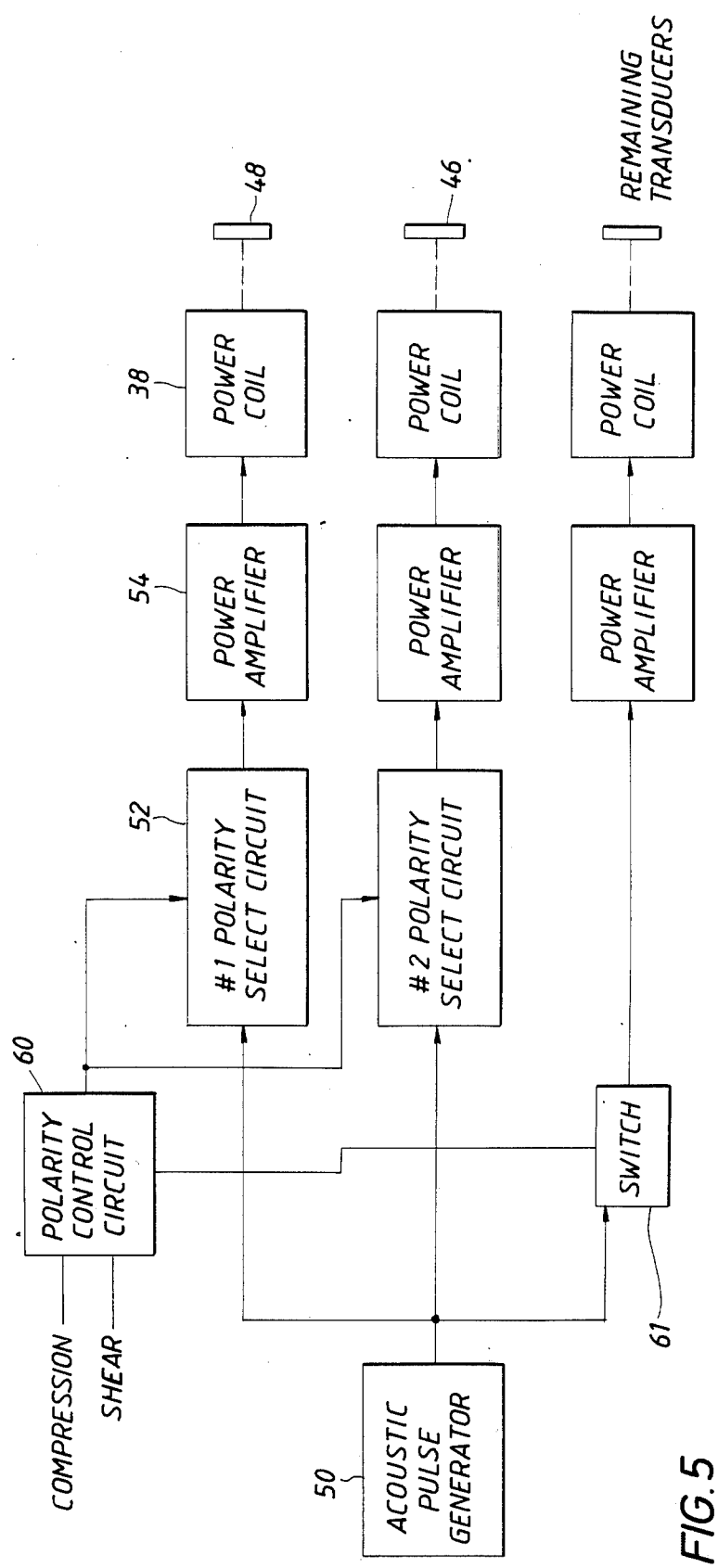
FIG. 4
FIG. 5

TRANSDUCER FORMING COMPRESSION AND SHEAR WAVES FOR USE IN ACOUSTIC WELL LOGGING

BACKGROUND OF THE INVENTION

Acoustic well logging involves placement of acoustic transducers (both for transmitters and receivers) in a sonde. The transducers are used to form vibratory energy waves which travel in the borehole and the formations adjacent to the sonde and to receive the returned waves. The vibratory energy waves are characterized as compression waves, shear waves, and pseudo-Rayleigh waves. In a transducer system which is axially symmetric, and in which the shear wave velocity is greater than borehole fluid velocity, the acoustic pulse at a receiver includes all three types of waves. In that situation, a full wave acoustic log can be obtained from the formation. However, there are formations in which the shear wave velocity is less than the borehole fluid velocity. In that instance, the transducers will not create the shear and pseudo-Rayleigh waves in conjunction with a radially symmetric pressure pulse.

According to theoretical developments, a nonaxially symmetric source would preferentially generate shear waves over compression waves. This then would enable acoustic logging techniques which involve shear wave analysis. In the past, the provision of transducers which preferentially form and respond to both kinds of waves (compression and shear) have not been available. Rather, duplicate sets of transducers for both the transmitter and receiver systems in acoustic logging devices have been used. Thus, one separate system would create and respond to the compression wave while a second system would create and respond to the shear wave. The apparatus of this invention sets forth a single transducer system that can be used to form both compression and shear wave pulses. Moreover, the system can be used for both transmission and receiving.

BRIEF SUMMARY OF THE INVENTION

The present apparatus is a system formed of a set of N transducer elements arranged circumferentially about a cylindrical sonde. In a preferred form, a radially arranged plurality of magnetostrictive elements is used to simultaneously symmetrically deflect radially a set of propagation elements. The radially arranged magnetostrictive elements use coils responsive to a timed electrical pulse thereby initiating synchronized radial movement. The radial movement can involve radial expansion outwardly simultaneously occuring in the N magnetostrictive transducer elements and simultaneous radial inward deflection. Alternately, the N transducer elements can be driven out of synchronization so that diametrically opposite transducer elements are 180 degrees out of phase with one another, thereby creating a shear wave. The transducers (fixed in location) cause deflection only at a deflection plates affixed at the radially outer ends of the circumferentially distributed magnetostrictive members.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a view similar to FIG. 2 showing the acoustic transducers operating as a dipole to form a shear wave;

FIG. 4 is an enlarged detailed view of a single acoustic transducer element featuring a radial magnetostrictive element; and FIG. 5 is a schematic block diagram of an electrical driver system for the acoustic transducers shown in other views.

DETAILED DESCRIPTION OF THE PREFERRED EMBODIMENT

Figures 1, 2:
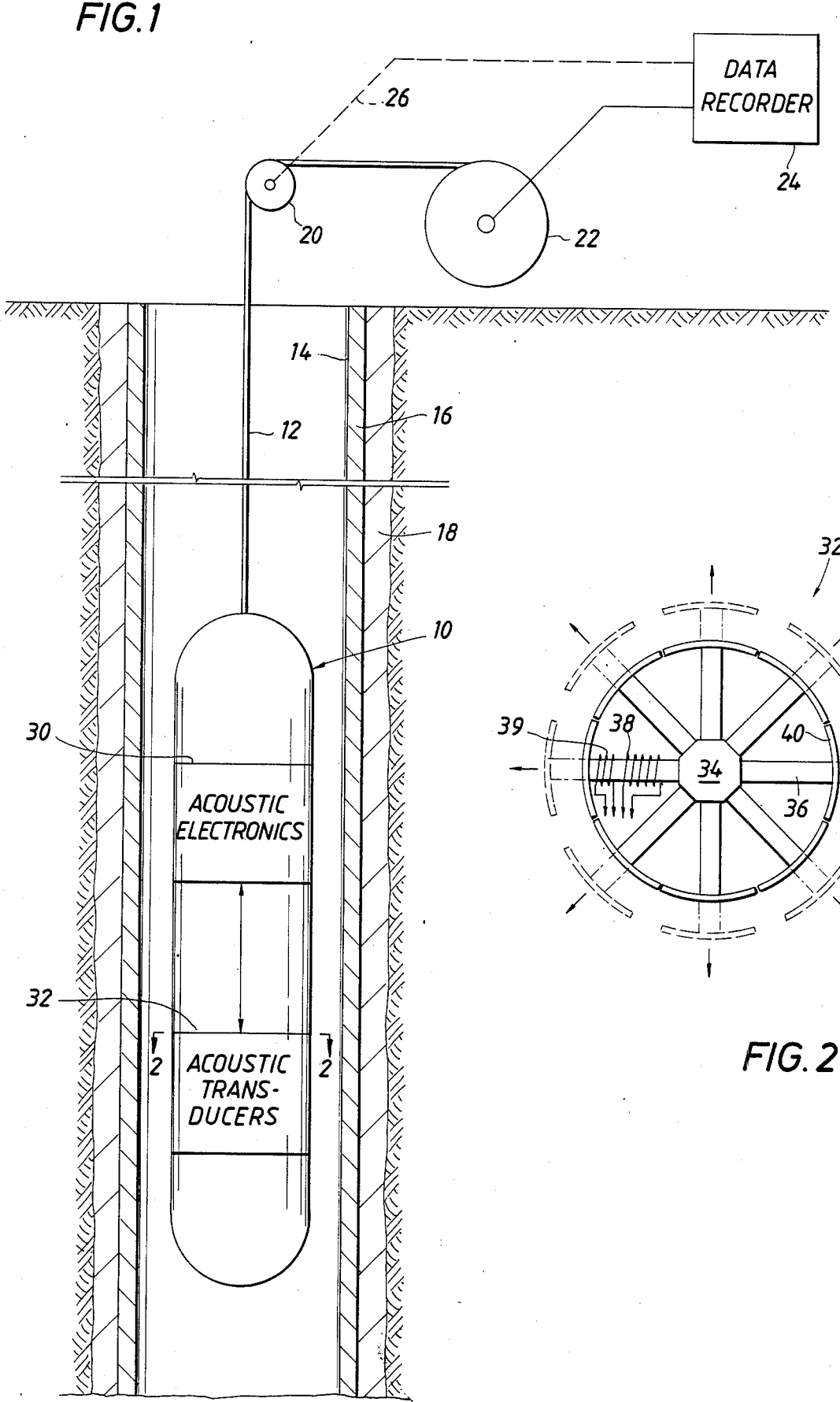
FIG. 1 shows an acoustic logging system supported on a cable in a well borehole for conducting acoustic logging operations utilizing the transducers of the present apparatus.
FIG. 2 is a sectional view through the sonde of FIG. 1 showing a set of N acoustic transducers deployed around the sonde, and showing in dotted line symmetric operation thereof.

Attention is first directed to FIG. 1 of the drawings where an acoustic logging tool is indicated by the numeral 10. It is supported on an armored logging cable 12 in a well borehole 14. The well borehole 14 is cased with a casing at 16, and the casing is surrounded by cement at 18. While a cased hole is shown, it will be undertood that the transducer of the present invention is applicable to open or cased hole logging with equal facility. The armored logging cable 12 extends upwardly to a sheave 20 and is spooled on a drum 22. The drum enables connection through the logging cable 12 with a data reduction and a recorder system indicated at 24. The recording or log that is made in the well is correlated to the position of the sonde 10 in the well and to this end, a mechanical or electronic depth measuring apparatus 26 provides data from the sheave 20 to the recorder to thereby enable the data to be matched with depth in the well.

The sonde 10 houses an electronic system 30 for operation of the equipment. The electronic system is connected with a set of acoustic transducers at 32. They form the various vibratory energy waves to be described in accordance with the teachings of the present disclosure.

In FIGS. 2 and 3 of the drawings, the several transducers have been shown in sectional view. The surrounding shell and other support structure of the sonde have been omitted for sake of clarity. The system shown at 32 in FIG. 2 of the drawings incorporates a central structural member 34. Structural member 34 is surrounded by N radially disposed magnetostrictive elements. One is identified at 36. Most ferromagnetic materials exhibit magnetostriction when placed in a magnetic field. Magnetic domains within the material rotate into alignment with the applied magnetic field and either grown or shrink in size which causes internal strain within the material. The physical element chosen for this application is a rod transducer and axial strain $\Delta l/A$ is used to generate acoustic energy.

One material well suited for magnetostrictive transducers is 2V-permadur (Arnold Engineering Co.).

Composition of this material is vanadium, cobalt and iron. Another material which exhibits excellent magnetostriction is terfenol. This material is composed of terbium, dysprosium and iron. The coil 38 is used to generate the signal magnetic field within the rod element 36. The coil 39 is used to bias the rod element to its midpoint length. Permanent magnets may also be used to bias the rod. Magnetostriction is unipolar in that the strain produced by the magnetic field always has the same sign. In this application, the rod length must be increased by the signal magnetic field and also decreased by the signal magnetic field; therefore the coil 39 is needed to bias the transducer to its midpoint length. It will be appreciated that all of the magnetostrictive elements are identical in construction and differ only in their angular arrangement around the central structural member 34. Moreover, there are N units where N is a whole number integer. It is preferable to have a minimum of about six. In FIG. 2, eight transducers are include. They are evenly circumferentially spaced about the circle where the several transducer elements are identical and differ only in angular position.

Attention is momentarily directed to FIG. 4 of the drawings, where a single radially disposed magnetostrictive element 36 is shown. Again, the coil 38 is wound around it. Current in the coil 38 forms a magnetic field which acts on the magnetostrictive element 36, causing it to expand and contract. The magnetostructive element 36 supports an arcuate circumferential transducer plate 40 at the outer end. The plate element 40 is made of a low mass material, such as aluminum. Tranducer plate 40 and element 36 are shown in full line without activation. When a magnetic field is applied through the coil by passing a pulse of electrical current 38 to the element 36, the magnetostructive element is caused to radially expand and contract with changes in the polarity of the applied magnetic field. In the extended position, this being indicated in dotted line position at 42, the transducer plate 40 has moved radially outwardly. By contrast, tranducer plate 40 moves radially inwardly to the retracted dotted line position 44 on contraction of the magnetostructive element 36. As will be understood, the two dotted line positions 42 and 44 are exaggerated for purposes of emphasis. The actual range of displacement of the plate 40 is relatively small, but it is nevertheless sufficient to cause the plate 40 to couple a vibrating energy wave front outwardly from the plate. The entire transducer assembly is housed in such a manner as to facilitate equalizing the fluid pressures acting on either side of the plates 40, such as a rubber cylinder.

Returning now to FIG. 2 of the drawings, it will be observed that the N radially disposed magnetostructive elements 36 all support similar transducer plates as 40 arranged in a circle. In this particular embodiment, there are eight radially disposed magnetostructive elements and therefore eight transducer plates are used. They are preferably made relatively wide in surface area so that they somewhat approach a full circle as shown in FIG. 2. If they are synchronously operated, they move radially outwardly to the dotted line positions at 42, common to all the elements in synchronized movement. This will form a compression wave radiating outwardly in all directions from the several transducer elements. As will be understood, they move outwardly to the dotted line position at 42 and move inwardly to the contracted dotted line position in the fashion illustrated with FIG. 4, thereby forming the half-cycles of the compression wave. That is, movement out of the extreme range forms the positive half-cycle and movement to the retracted extreme forms the negative half-cycle.

Attention is now directed to FIG. 3 of the drawings. There, two diametrically opposite transducers have been operated so that they move 180° out of phase with one another. Thus, the dotted line position shown at 46 illustrates one transducer plate moved radially inwardly. The opposite transducer has moved radially outwardly to the dotted line position at 48. So to speak, the two diametrically opposite transducers operate as a dipole to excite the formation in shear mode. The arrangement of FIG. 2 dynamically shows the formation of a compression wave. Utilizing the dotted line positions of FIG. 3, the two opposite transducers move in the phase opposed fashion illustrated and thereby form a shear wave.

Attention is now directed to FIG. 5 of the drawings. There, the numeral 50 identifies an acoustic pulse generator. Typically, the amplitude is fixed for each pulse transmitted from the acoustic logging apparatus. The acoustic pulse generator 50 thus may be generally described as a generator having a specified pulse width, and having an approximately uniform amplitude. This forms an acoustic pulse. The acoustic pulse is applied to a first polarity select circuit 52. In turn, the pulse is then applied to a power amplifier 54 which then is connected with a control coil 38.

In FIG. 2, there are N acoustic transducers and in like fashion, there are N circuits driven by the pulse generator 50. Thus, a polarity control driver 60 forms a timed signal operating the polarity select 52. The timed operation of the polarity select circuit 52 is important relative to the #1 and #2 polarity selectors. Where simultaneous operation is wanted so that a compression wave is formed, there is no polarity change between the power amplifiers. That is, the pulse formed by the pulse generator 50 is applied to all the coils 38 simultaneously. In that instance, a compression wave is formed. Where a shear wave is to be formed, diametrically opposite transducers are 180 degrees out of phase with one another. Transducer plates 48 and 46 are 180 degrees out of phase. All other transducer coils are turned off by switch 61. In the shear wave mode, only plates 48 and 46 are driven to form a vibration thereby resulting in formation of a shear wave. All other plates are not powered.

From the foregoing, it will be understood that there are different modes of timing for the various transducers.

In operation, the acoustic logging device of the present disclosure can be used to form a series of compression waves. It can be operated to form a series of shear waves. It can be operated to alternate between the two modes of operation. If no control signal whatsoever is formed, all the transducers operate at the same instant and thereby form a compression wave.

As will be understood, the number N can vary. Further, the several transducers are operated to form acoustic waves of selected frequencies, amplitudes and duration suitable for acoustic logging.

While the foregoing is directed to the preferred embodiment, the scope is determined by the claims which follow:

What is claimed is:

1. Acoustic wave generating apparatus comprising:

(a) radially directed expansion means including N expansion means elements in number where N is an integer, and wherein said expansion means elements move radially directed outwardly and inwardly, said radial outward and inward movement being relative to a center line, and through a selected stroke length to thereby deflect an attached transducer outer face, said expansion means elements forming a stroke of selected amplitude and frequency to create an acoustic wave, wherein the acoustic wave is a compression or shear wave depending on the relative phase of operation of said expansion means when placed in a well borehole;

(b) coil means wrapped around an elongate, radially directed magnetostrictive element comprising said expansion means elements;

(c) N driver amplifiers, one being connected to each of said elements, and all are provided with a driving signal from a signal generating means to form acoustic waves dependent on the driving signal; and (d) polarity selecting means connected to each of said amplifiers to time operation of said amplifiers and thereby time formation of acoustic waves from said transducer outer faces wherein changes in timing cause the acoustic waves to be compression or shear waves.

2. The apparatus of claim 1:

(a) wherein said expansion means comprises magnetostrictive elements fixed to a structural member aligned with the center line of a sonde;

(b) wherein the acoustic wave generating apparatus is provided with means responsive to said expansion means elements stroke amplitude and frequency to provide a receiver output signal, thus being usable as a transceiver transducer; and (c) wherein said expansion means elements comprise coil means wrapped around a radially outwardly directed magnetic element.

3. The apparatus of claim 1 wherein N is 8.

4. The apparatus of claim 1 wherein said coil means are N in number.

* * * * *